(12) United States Patent
Bamba

(10) Patent No.: US 9,319,604 B2
(45) Date of Patent: Apr. 19, 2016

(54) IMAGE PROCESSING APPARATUS AND METHOD

(71) Applicant: CANON KABUSHIKI KAISHA, Tokyo (JP)

(72) Inventor: Yasuo Bamba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/148,916

(22) Filed: Jan. 7, 2014

(65) Prior Publication Data

US 2014/0204240 A1 Jul. 24, 2014

(30) Foreign Application Priority Data

Jan. 18, 2013 (JP) ................................. 2013-007844

(51) Int. Cl.
*H04N 5/343* (2011.01)
*H04N 5/232* (2006.01)
*H04N 5/345* (2011.01)

(52) U.S. Cl.
CPC ........... *H04N 5/343* (2013.01); *H04N 5/23229* (2013.01); *H04N 5/23245* (2013.01); *H04N 5/23293* (2013.01); *H04N 5/23296* (2013.01); *H04N 5/3454* (2013.01)

(58) Field of Classification Search
CPC .......... H04N 5/23245; H04N 5/23296; H04N 5/3454; H04N 5/23293; H04N 5/343; H04N 5/2621; H04N 5/23229
See application file for complete search history.

(56) References Cited

U.S. PATENT DOCUMENTS

| | | | |
|---|---|---|---|
| 2007/0195182 A1* | 8/2007 | Ito | 348/308 |
| 2007/0279512 A1* | 12/2007 | Maruyama et al. | 348/333.11 |
| 2009/0160947 A1 | 6/2009 | Shigeta et al. | |
| 2010/0232704 A1* | 9/2010 | Thorn | G06F 3/04845 382/195 |
| 2011/0058014 A1* | 3/2011 | Yamashita et al. | 348/36 |

FOREIGN PATENT DOCUMENTS

JP 2009171545 A 7/2009

* cited by examiner

*Primary Examiner* — Paul Berardesca
(74) *Attorney, Agent, or Firm* — Rossi, Kimms & McDowell LLP

(57) ABSTRACT

An image processing apparatus inputs captured image data that has been read from an image capturing unit in accordance with a reading mode, and processes the input captured image data so as to enable identification of the reading mode used in reading the captured image data from the image capturing unit.

27 Claims, 7 Drawing Sheets

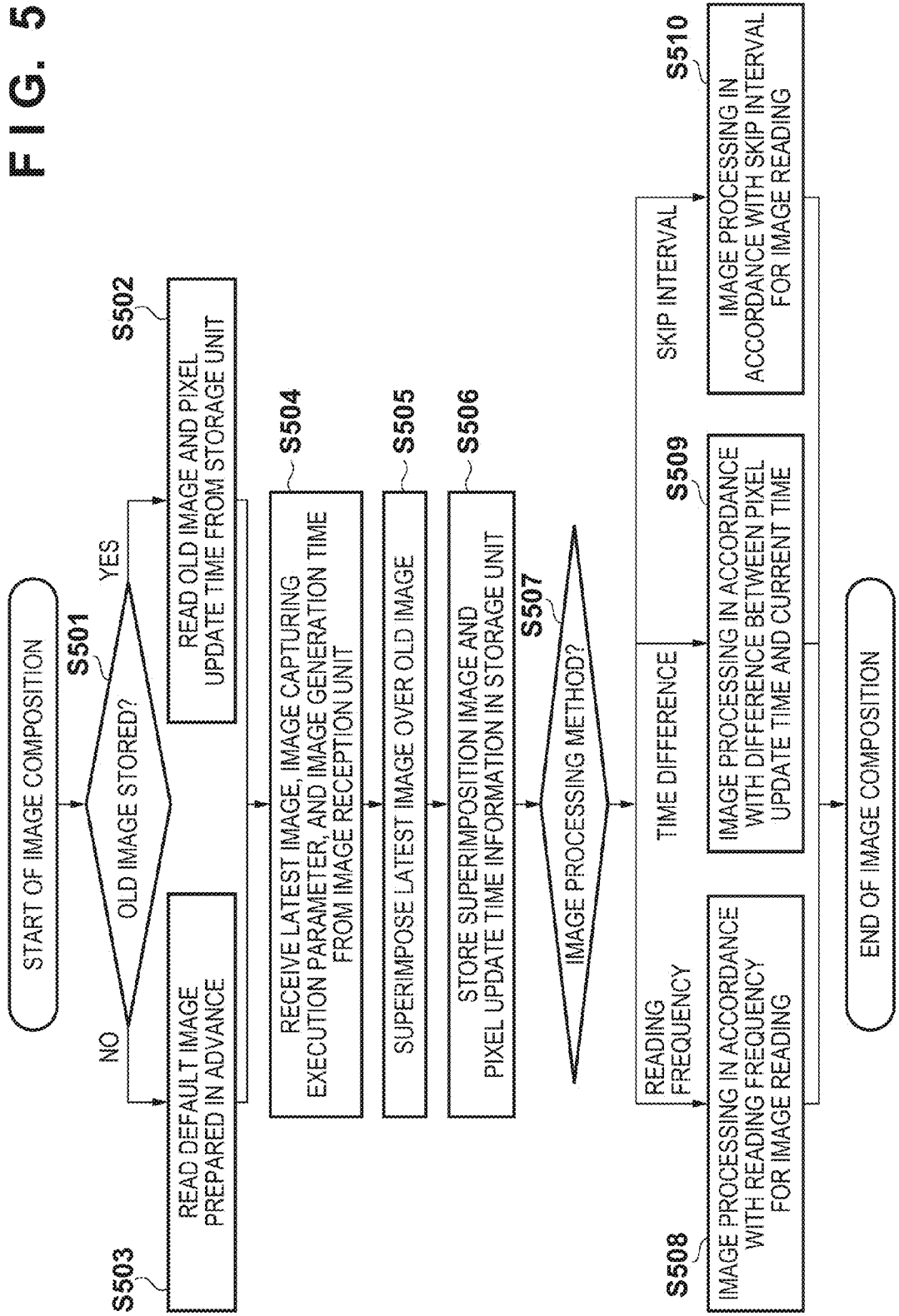

IMAGE PROCESSING APPARATUS AND METHOD

BACKGROUND OF THE INVENTION

1. Field of the Invention

The present invention relates to an image processing apparatus and method for processing captured image data read from an image capturing unit.

2. Description of the Related Art

Some of the recent image capturing elements can switch among "all-pixel reading mode", "partial reading mode", and "thinned-out reading mode". In the "all-pixel reading mode", signals are read from all of the pixels on an image capturing element. In the "partial reading mode", signals are read only from pixels located in an arbitrary region on the image capturing element. In the "thinned-out reading mode", signals are read while skipping pixels on the image capturing element at an arbitrary interval. The "partial reading mode" and the "thinned-out reading mode" may be combined, that is to say, signals may be read while skipping pixels located in an arbitrary region at an arbitrary interval.

Conventionally, there has been a surveillance camera system incorporating an image capturing element that can change its reading mode.

US 2009/0160947 A1, granted a patent, discloses a system for reading a designated region on an image capturing element at a short time interval, and performing thinned-out reading of other regions in multiple batches at a longer time interval. US 2009/0160947 A1 also discloses a system in which an entire-region thinned-out image is displayed on the left side of a monitor, and a partial image is displayed on the right side of the monitor in an enlarged manner.

Furthermore, an image capturing system is configurable that continuously reads only a specific region but does not read regions other than the specific region.

However, the image capturing system disclosed in US 2009/0160947 A1 does not explicitly display the frequencies at which entire-region thinned-out images and partial images are read. This poses the problem that the frequencies at which the entire-region thinned-out images and partial images are updated cannot be visually perceived. In addition, the skip interval for image reading cannot be visually perceived.

Similarly, in the case where only a specific region is continuously read and regions other than the specific regions are not read, it is not possible to visually perceive how long the regions other than the specific region have been left without being updated.

SUMMARY OF THE INVENTION

The present invention provides an image processing apparatus for processing captured image data that has been read from an image capturing unit, the apparatus including: an input unit that inputs captured image data read from the image capturing unit in accordance with a reading mode; and a processing unit that processes the captured image data input by the input unit so as to enable identification of the reading mode used in reading the captured image data from the image capturing unit.

The present invention also provides an image processing method used in an image processing apparatus for processing captured image data that has been read from an image capturing unit, the method including the steps of: inputting captured image data that has been read from the image capturing unit in accordance with a reading mode; and processing the input captured image data so as to enable identification of the reading mode used in reading the captured image data from the image capturing unit.

Further features of the present invention will become apparent from the following description of exemplary embodiments with reference to the attached drawings.

BRIEF DESCRIPTION OF THE DRAWINGS

FIG. 5 is a flowchart of a procedure of an image processing unit.

DESCRIPTION OF THE EMBODIMENT

Figure 1:
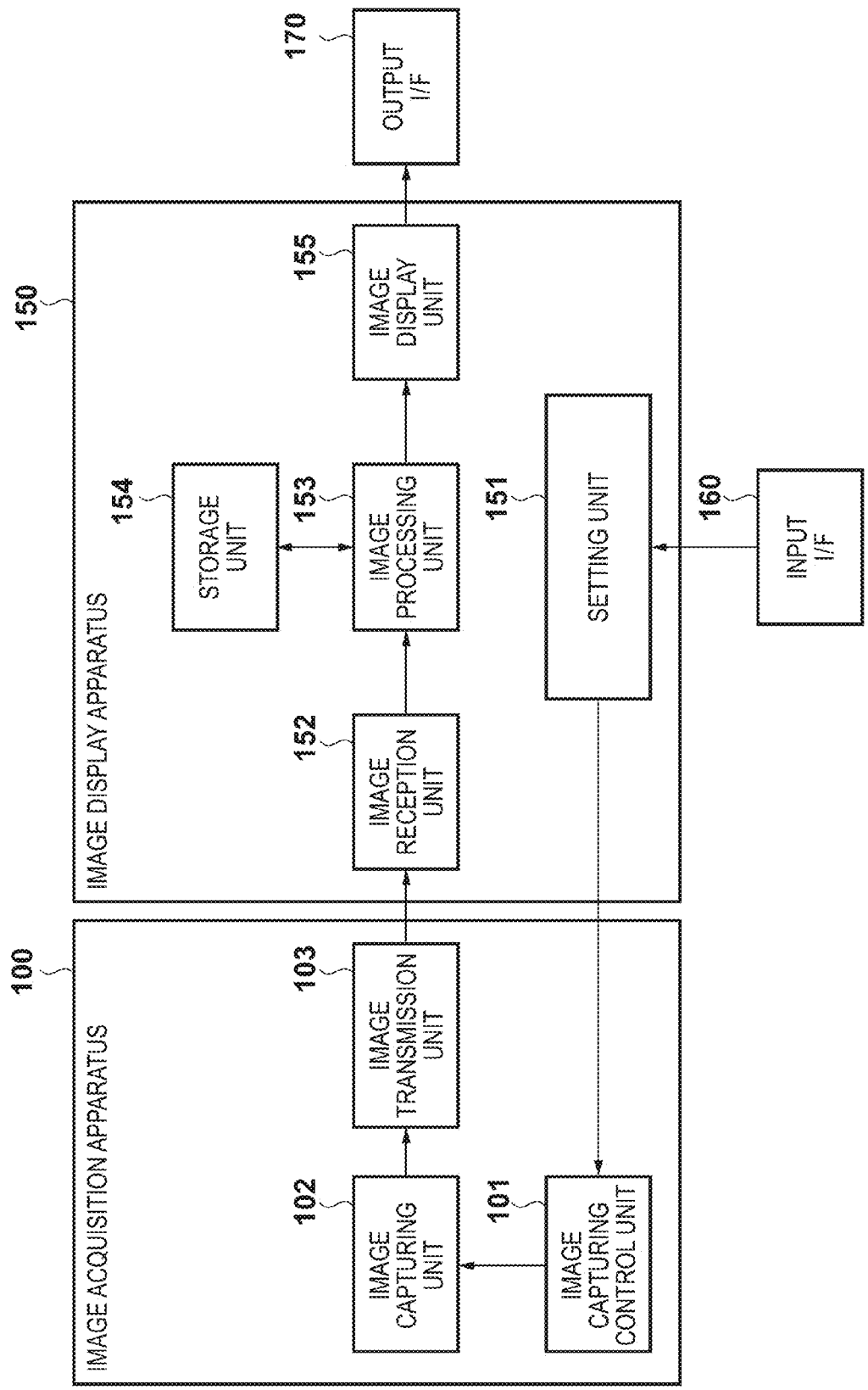
FIG. 1 shows one working example of a configuration of an image processing apparatus.

The present invention will be described below in detail based on an embodiment with reference to the attached drawings. It should be noted that configurations presented in the following embodiment are merely illustrative, and the present invention is by no means limited to configurations shown in the drawings.

FIG. 1 shows one example of a configuration of an image processing apparatus.

In FIG. 1, the image processing apparatus is made up of an image acquisition apparatus 100 and an image display apparatus 150. The image acquisition apparatus 100 is composed of an image capturing control unit 101, an image capturing unit 102, and an image transmission unit 103. The image display apparatus 150 is composed of a setting unit 151, an image reception unit 152, an image processing unit 153, a storage unit 154, and an image display unit 155.

The setting unit 151 sets an image capturing instruction parameter in accordance with the result of a user operation on an input interface (I/F) 160, such as a mouse. The image capturing instruction parameter is a parameter related to an image capturing method used by the image capturing unit 102. For example, the image capturing instruction parameter includes at least one of a region on an image capturing element, a skip interval for pixels on the image capturing element, and a reading frequency for the image capturing element. The region on the image capturing element has, for example, a rectangular shape or any polygonal shape. Alternatively, the region may have any other shape. The number of the region is one or more. The reading frequency denotes the number of times an image is read from the image capturing element within a certain time period. The skip interval denotes a rate at which reading of pixels is skipped. A method for setting the image capturing instruction parameter will be described later.

The image capturing control unit 101 receives the image capturing instruction parameter set by the setting unit 151, and controls an image capturing method (image acquisition method) used by the image capturing unit 102.

Based on the image capturing instruction parameter set by the image capturing control unit 101, the image capturing unit 102 acquires signals corresponding to light focused on the image capturing element. Then, an image is formed by applying, to the acquired signals, processing such as AD conversion in accordance with a method set by a program and the like. The image capturing unit 102 can not only set a plurality of reading regions, but also perform at least one of changing of the reading regions and acquisition control for the reading regions. The acquisition control mentioned herein denotes, for example, control of the reading frequency or the skip interval for images. However, the acquisition control is not limited to such control, and may be, for example, control of a bit depth of the image capturing elements and control of the number of bands of the image capturing element.

The image transmission unit 103 receives the image, an image capturing execution parameter used to form the image, and an image generation time from the image capturing unit 102, and transmits them to the image reception unit 152. The items included in the image capturing execution parameter are similar to those included in the image capturing instruction parameter. However, due to hardware-related restrictions on the image capturing element, the values of the image capturing execution parameter do not necessarily match those of the image capturing instruction parameter. The transmitted image may be a sequence of continuous still images such as JPEG images, or may be a video generated from a sequence of continuous still images using MPEG and the like.

The image reception unit 152 receives the image, the image capturing execution parameter, and the image generation time from the image transmission unit 103, and passes them to the image processing unit 153.

The image processing unit 153 receives the image, the image capturing execution parameter, and the image generation time from the image reception unit 152. With the use of the received information, an image is generated by updating a part or an entirety of an image stored in the storage unit 154. Furthermore, processing for enabling visual distinction is executed in accordance with the reading frequency for image reading, the skip interval for image reading, or a time period that has elapsed since the last image update. A detailed description will be given later.

The storage unit 154 stores an image that has been stored by the image processing unit 153 in the past, together with pixel update time information. The pixel update time information shows the image generation time of an image for which pixels were last updated. The pixel update time information holds image update times of all pixels. For example, assume the case where an entire image has been updated in sequence using three images with the image generation times of 0, 100 and 200. In this case, if only pixels of a certain region are updated in sequence using three images with the image generation times of 210, 220 and 230, the image update times of the pixels belonging to the certain region are 230, and the image update times of pixels belonging to other regions are 200.

Figure 2:
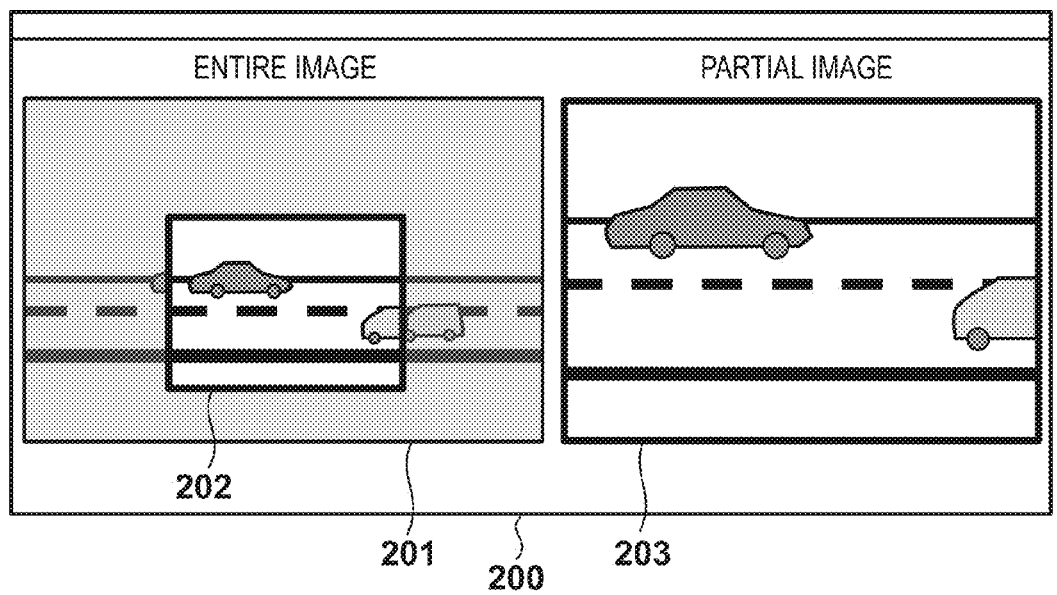
FIG. 2 shows an example of display on an image display unit.

The image display unit 155 displays the image generated by the image processing unit 153 on an external apparatus such as a display. Below, it will be assumed that the image capturing element operates in an all-pixel reading mode (first reading mode) at first and then changes to a partial reading mode (second reading mode) as it progresses, and a description will be given of an image that is displayed when ten seconds has elapsed since the change. FIG. 2 shows an image 200 displayed by the image display unit 155 in this case.

An entire image display part 201 displays an image of the same angle of view as a region captured when the image capturing element performs all-pixel reading. In this case, an image that was last acquired ten seconds ago in the all-pixel reading mode is displayed with low saturation, that is to say, almost in black and white, in accordance with the elapsed time period of ten seconds.

A partial reading region 202 refers to a region in which an image (partial image) acquired through partial reading in the partial reading mode of the image capturing element is superimposed over an image (entire image) acquired through entire-pixel reading in the all pixel reading mode. An image corresponding to the partial reading region 202 is frequently updated using images that are transmitted from the image transmission unit 103 with high frequency. Image processing for reducing the saturation is not applied to this region. Therefore, by looking at the entire image display part 201, a portion that has not been updated since pixels were last read can be visually confirmed.

A partial image display part 203 displays the image corresponding to the partial reading region 202 in an enlarged manner. While the entire image display part 201 and the partial image display part 203 are displayed in the same window in the present example, they may alternatively be displayed separately in different windows or on different external apparatuses. Furthermore, there may be a plurality of partial reading regions 202, and a plurality of partial image display parts 203 corresponding to the plurality of partial reading regions 202.

A method for setting the image capturing instruction parameter and a method for superimposing an image will now be described in more detail.

The image capturing instruction parameter is set by the setting unit 151. More specifically, the image capturing instruction parameter is set, for example, by a user via an input device such as a mouse and a keyboard.

Figure 3:
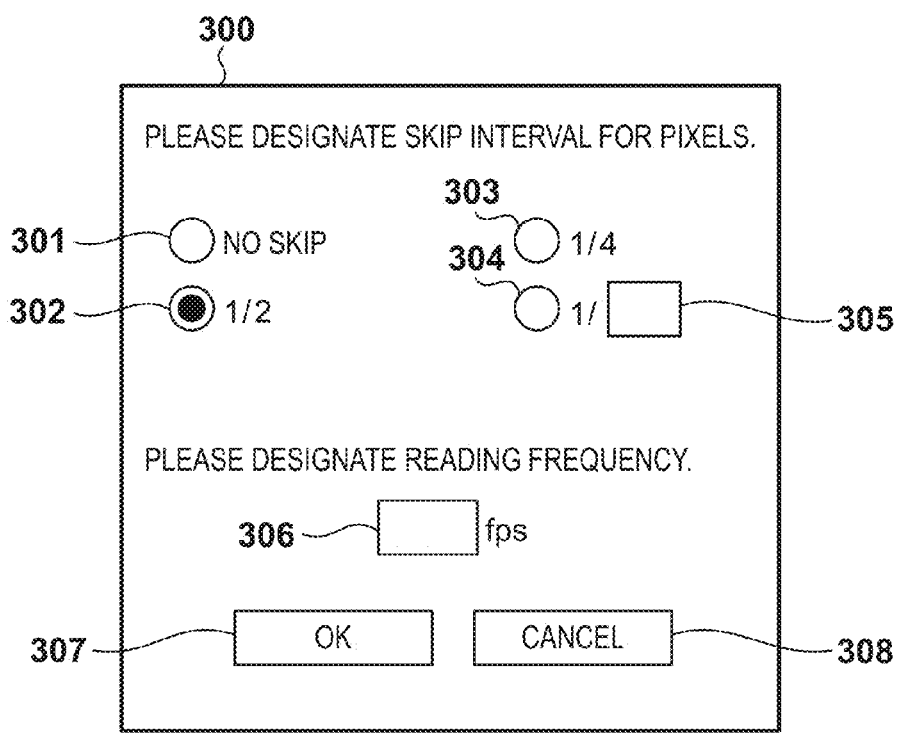
FIG. 3 shows an example of a user interface for setting an image capturing instruction parameter.

First, the user designates a region targeted for partial reading by designating a diagonal of a rectangle on an entire image via a drag operation. That is to say, a diagonal of the partial reading region 202 is designated on the entire image display part 201. Subsequently, a skip interval for pixels on the image capturing element is designated. FIG. 3 shows an example of a user interface 300 for designating the skip interval.

In FIG. 3, a radio button 301 is a control element for selecting the setting in which pixels are not skipped. A radio button 302 is a control element for selecting the setting in which vertical columns and horizontal rows of pixels are each read at a density of ½. In this case, the number of read pixels is approximately ¼ of the number of pixels read in the case where pixels are not skipped. A radio button 303 is a control element for selecting the setting in which vertical columns and horizontal rows of pixels are each read at a density of ¼. A radio button 304 is a control element with which an arbitrary skip interval can be set by inputting an arbitrary numeric value to a text field 305.

One of the radio buttons 301 to 304 can be selected, and FIG. 3 shows the state where the radio button 302 is selected.

Furthermore, an arbitrary reading frequency can be set by inputting an arbitrary numeric value to a text field 306.

By pressing an OK button 307, the selected or designated parameter is designated as the skip interval. The designated skip interval is cancelled by pressing a cancel button 308.

The setting unit 151 may automatically set the image capturing instruction parameter in accordance with the result of output from an external sensor (not shown in the drawings) and an image analysis processing unit (not shown in the drawings). For example, the image analysis processing unit detects a moving object by analyzing an image stored in the storage unit 154. The setting unit 151 acquires the position and the size of the moving object detected via moving-object detection, and determines a region including the moving object, a skip interval corresponding to the size of the moving object, and a reading frequency corresponding to the speed of the moving object. Then, the setting unit 151 automatically sets the region including the moving object, the skip interval, and the reading frequency as the image capturing instruction parameter.

Figure 4:
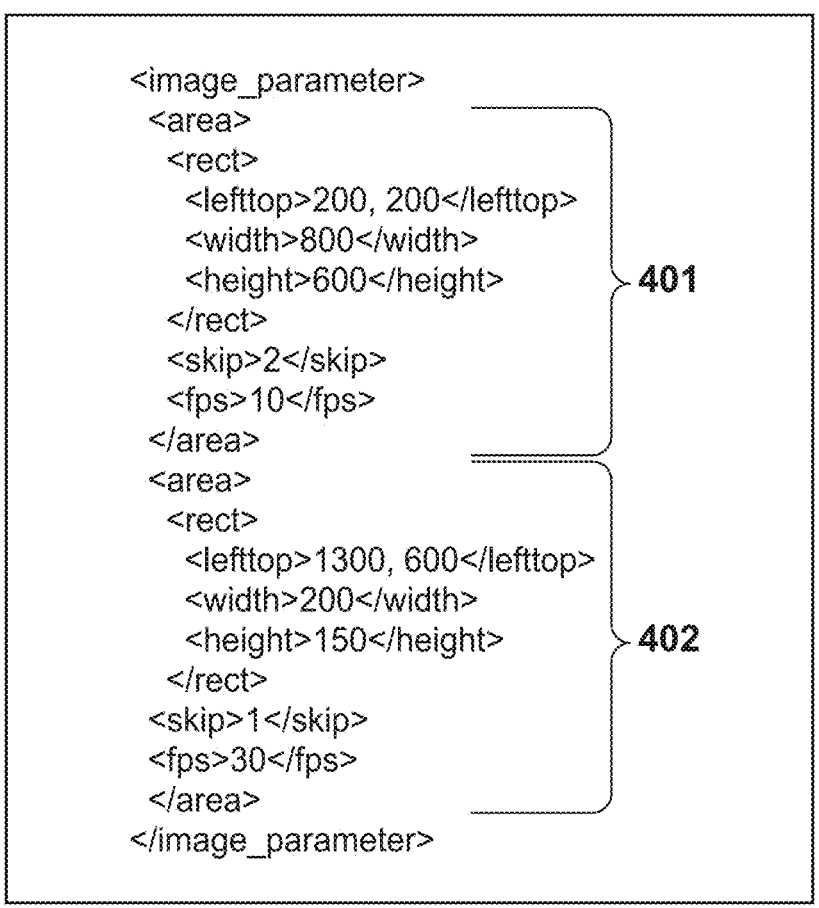
FIG. 4 shows an example of an image capturing instruction parameter.

The setting unit 151 further transmits the set image capturing instruction parameter to the image capturing control unit 101 in accordance with a predetermined protocol. FIG. 4 shows an example of a protocol expressed as a text file.

More specifically, FIG. 4 shows an example of an image capturing instruction parameter for the case where there are two partial reading regions. This parameter indicates that a first partial reading region 401 has upper-left coordinates (x, y) of (200, 200), a horizontal width of 800, a vertical height of 600, a skip interval of ½, and a reading frequency of ten per second. This parameter also indicates that a second partial reading region 402 has upper-left coordinates (x, y) of (1300, 600), a horizontal width of 200, a vertical height of 150, and a reading frequency of 30 per second, and that pixels are not skipped in the second partial reading region 402.

Below is a detailed description of the operations of the image processing unit 153 with reference to a flowchart of FIG. 5. The image processing unit 153 is a computer, and executes processing shown in FIG. 5 by executing a program read from a memory (not shown in the drawings). The flowchart of FIG. 5 represents a part of the program executed by the image processing unit 153, i.e. the computer. The memory is a storage medium storing the program in such a manner that the image processing unit 153, i.e. the computer can read the program.

In step S501, the image processing unit 153 determines whether or not an old image is stored in the storage unit 154. It should be noted that the old image denotes an old superimposition image that the image processing unit 153 stored in the storage unit 154. The angle of view of this old image matches the angle of view used in the case where the image capturing element performs all-pixel reading. It should be noted, however, that the resolution of the old image does not necessarily match the resolution used in the case where the image capturing element performs all-pixel reading. For example, in the case where the image capturing element has a horizontal resolution of 2000 pixels and a vertical resolution of 1000 pixels, the old image may have a horizontal resolution of 2000 pixels and a vertical resolution of 1000 pixels, or may have a horizontal resolution of 400 pixels and a vertical resolution of 200 pixels.

If the old image is stored (the YES branch of step S501), the image processing unit 153 proceeds to step S502 and reads the old image and pixel update time information stored in the storage unit 154. This pixel update time information shows the times when pixels of the old image stored in the storage unit 154 were updated. On the other hand, if the old image is not stored (the NO branch of step S501), the image processing unit 153 proceeds to step S503 and reads a default image that has been prepared in advance instead of the old image. The default image is, for example, an image in which all pixels are made of a single color. This default image is also stored in the storage unit 154.

In step S504, the image processing unit 153 receives an image, an image capturing execution parameter, and an image generation time from the image reception unit 152. The image received here will hereafter be referred to as a latest image.

In step S505, the image processing unit 153 generates a superimposition image by superimposing the latest image over the old image such that the angle of view of the latest image matches the angle of view of the old image. The angle of view is calculated based on the resolution used in the case where the image capturing element performs all-pixel reading, on the resolution of the old image, and on the image capturing execution parameter of the latest image. The image capturing execution parameter of the latest image includes a region of the latest image on the image capturing element. At the same time, the pixel update time information is updated. The pixel update times of pixels that are included in the old image or the default image read from the storage unit 154 and have been updated using the latest image are updated to the image generation time of the latest image.

In step S506, the image processing unit 153 stores the resultant superimposition image and pixel update time information in the storage unit 154.

In step S507, the image processing unit 153 determines to apply, to the pixels in the superimposition image, at least one of processing in steps S508, S509 and S510 that enables visual distinction. This determination may be made based on a preset user designation, or may be made automatically based on the image capturing execution parameter received from the image reception unit 152.

In step S508, the image processing unit 153 applies processing for enabling visual distinction to the pixels in the superimposition image in accordance with the reading frequency for image reading.

Figure 6A:
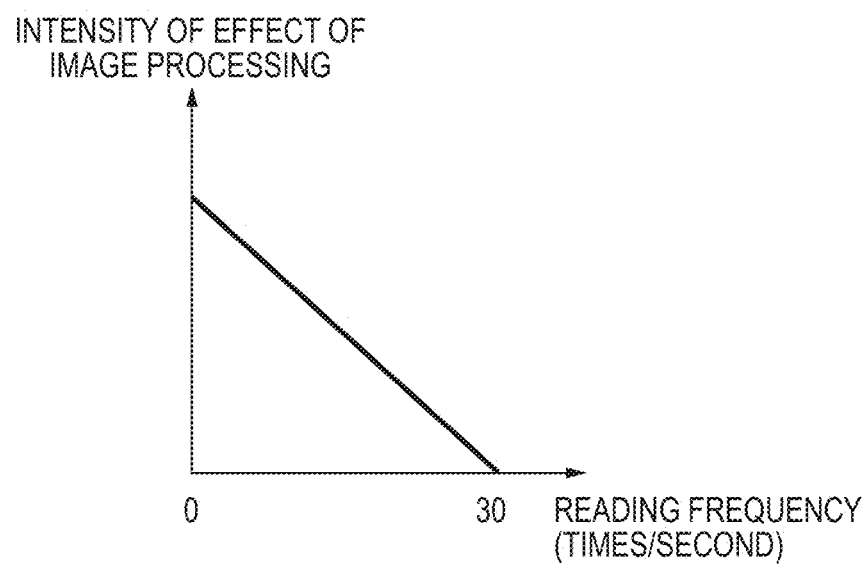
FIGS. 6A and 6B show one example of a relationship between a reading frequency and the intensity of the effect of image processing, and an example of image processing executed in accordance with the reading frequency.
Figure 6B:
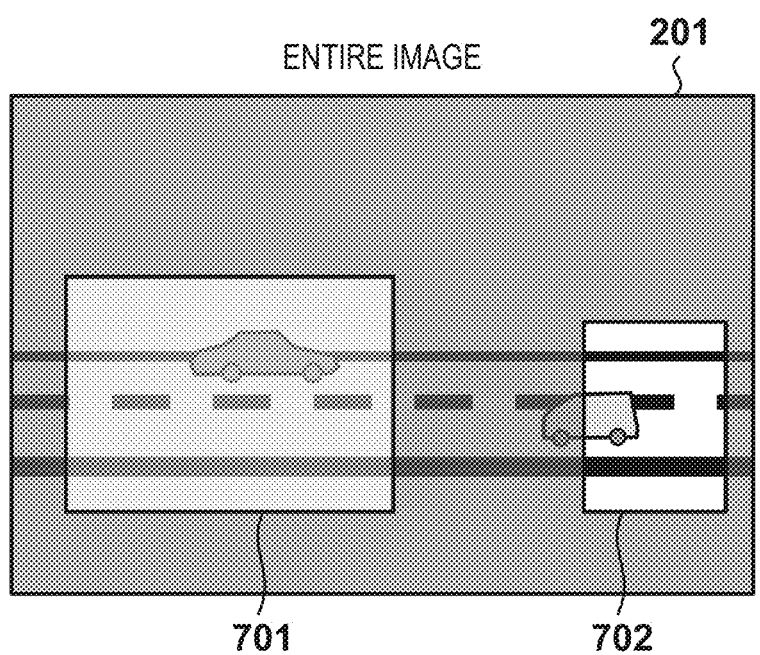

The following describes an example in which the processing for enabling visual distinction is executed in accordance with the reading frequency for image reading with reference to FIGS. 6A and 6B. In this example, as shown in FIG. 6A, the effect of image processing is more intense for a range with a lower reading frequency. For example, processing is executed such that the lower the reading frequency for a range, the darker the range. The reading frequency may be calculated by counting the number of times each pixel is updated in the image processing unit 153. The reading frequency may be included in the image capturing execution parameter passed from the image transmission unit 103 to the image reception unit 152. It should be noted that the reading frequency and the intensity of the effect of image processing may satisfy any relationship. For example, image processing may be executed only if the reading frequency is smaller than a certain preset threshold.

In FIG. 6B, an entirety of a screen is read at a rate of once every 3 seconds, a region 701 is read at a rate of 10 times per second, and a region 702 is read at a rate of 30 times per second. Here, the effect of image processing is more intense for a region with a lower reading frequency. For example, as the reading frequency for the region 702 is high, image processing is not applied thereto. Image processing is applied to the region 701 so as to enable visual perception of the low reading frequency therefor compared to the reading frequency for the region 702. The effect of image processing for a region other than the regions 701 and 702 is more intense than the effect of image processing for the region 701 so as to enable visual perception of the low reading frequency therefor compared to the reading frequency for the region 701.

In step S509, the image processing unit 153 calculates a post-pixel update elapsed period for each pixel in the superimposition image. A post-pixel update elapsed period refers to a difference between an image generation time of the latest image and a pixel update time of the superimposition image. Subsequently, processing for enabling visual distinction is executed in accordance with the post-pixel update elapsed period.

Figure 7A:
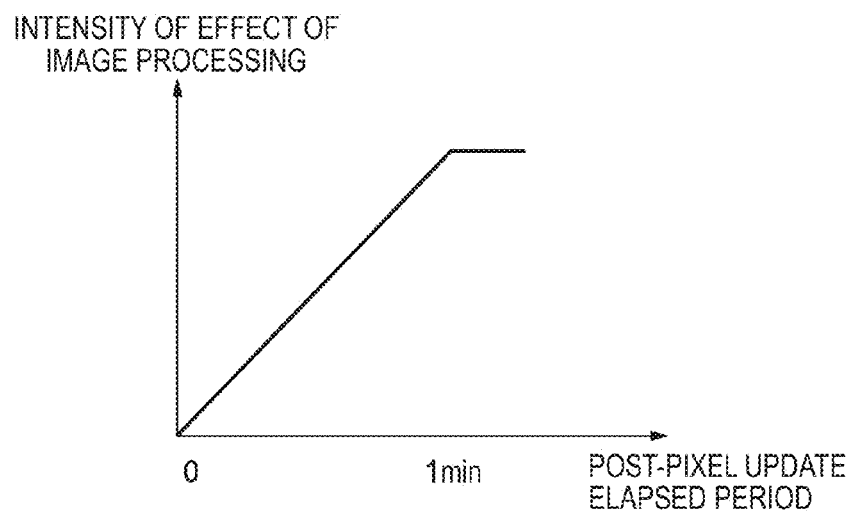
FIGS. 7A and 7B show one example of a relationship between a post-pixel update elapsed period and the intensity of the effect of image processing, and an example of image processing executed in accordance with the post-pixel update elapsed period.
Figure 7B:
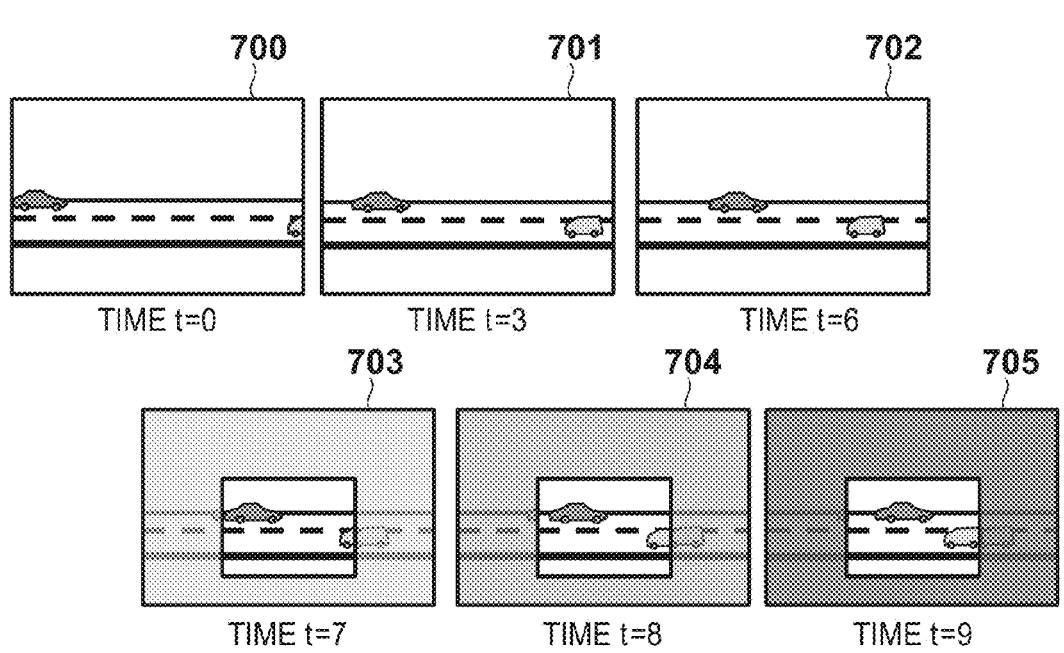

The following describes an example in which the processing for enabling visual distinction is executed in accordance with the post-pixel update elapsed period with reference to FIGS. 7A and 7B. In this example, as shown in FIG. 7A, the effect of image processing is more intense for a range with a longer post-pixel update elapsed period. It should be noted that the post-pixel update elapsed period and the intensity of the effect of image processing may satisfy any relationship. For example, image processing may be executed only if the post-pixel update elapsed period is longer than a certain preset threshold.

FIG. 7B shows images acquired after the image processing of the image processing unit 153 in the case where all-pixel reading is performed from time t=0 to time t=6 and partial reading is performed with respect to the central portion of the screen at time t=7 onward.

From time t=0 to time t=6, all of the pixels in the image are updated. Therefore, the post-pixel update elapsed periods of all of the pixels in the image are zero. At time t=7 onward, only pixels belonging to the area targeted for partial reading are updated. Therefore, in 703, 704 and 705 of FIG. 7B, while the post-pixel update elapsed periods of the pixels belonging to the partial reading region 202 at the central portion of the screen are 0, the post-pixel update elapsed periods of pixels belonging to other regions gradually increase. As the post-pixel update elapsed periods increase, the intensity of the effect of image processing increases. For example, from time t=0 to time t=6, i.e. when all pixels are updated, image processing is not executed. At time t=7, as the partial reading region is updated and a region other than the partial reading region is not updated, image processing is executed so as to enable visual perception of the state where the region other than the partial reading region is not updated when the partial reading region is updated.

Furthermore, at time t=8, the partial reading region is updated, and the region other than the partial reading region is not updated. Therefore, further image processing is applied to the image to which image processing was applied at time t=7, so as to enable visual perception of the state where the region other than the partial reading region has not been updated since before time t=7 when the partial reading region is updated. Image processing may be applied to the entire image at time t=6 such that the effect thereof is more intense than the effect of image processing applied at time t=7.

In step S510, the image processing unit 153 applies processing for enabling visual distinction to the pixels in the superimposition image in accordance with the skip interval for image reading.

Figure 8A:
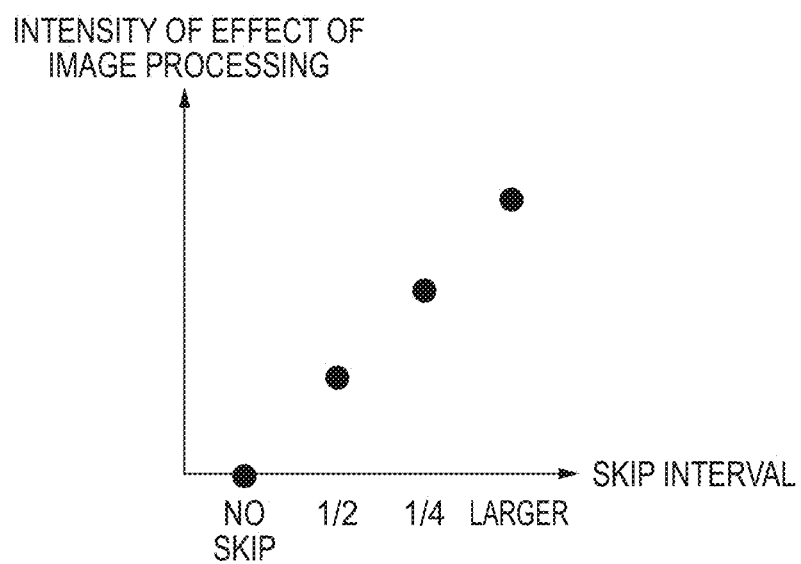
FIGS. 8A and 8B show one example of a relationship between a skip interval and the intensity of the effect of image processing, and an example of image processing executed in accordance with the skip interval.
Figure 8B:
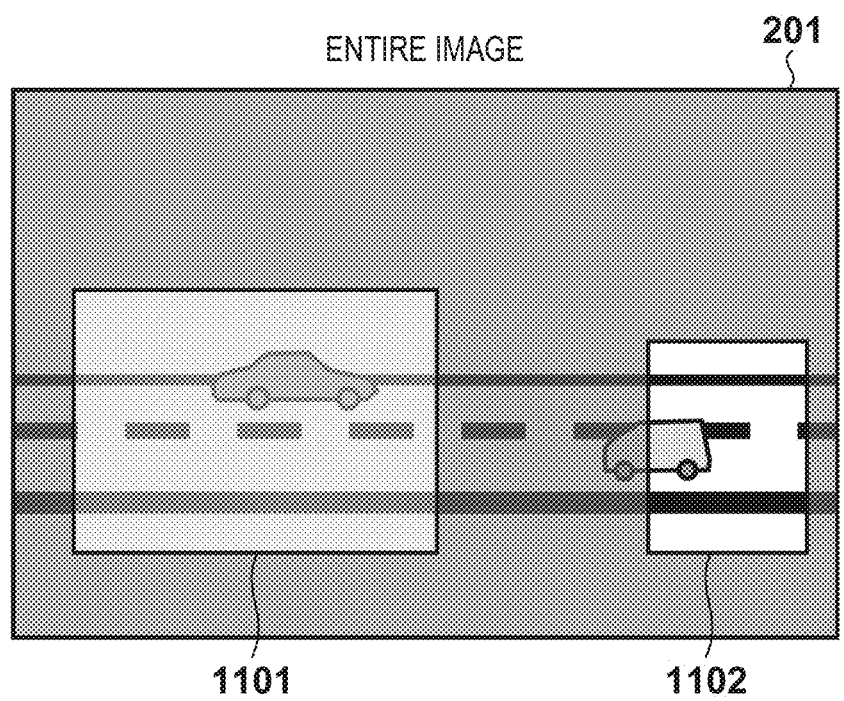

The following describes an example in which the processing for enabling visual distinction is executed in accordance with the skip interval for image reading with reference to FIGS. 8A and 8B. In this example, as shown in FIG. 8A, the effect of image processing is more intense for a range that includes pixels for which reading is skipped at a higher rate. It should be noted that the skip interval and the intensity of the effect of image processing may satisfy any relationship. For example, image processing may be executed only if the skip is performed.

In FIG. 8B, the entirety of the screen is read at a skip interval of ⅛, an area 1101 is read at a skip interval of ½, and a region 1102 is read with no skip. The effect of image processing is more intense for a range that includes pixels for which reading is skipped at a higher rate. That is to say, image processing is not applied to the region 1102, and image processing is applied to the area 1101 so as to enable visual perception of the low resolution thereof compared to the resolution of the region 1102. Image processing is applied to a region other than the regions 1101 and 1102 so as to enable visual perception of the low resolution thereof compared to the resolution of the region 1101.

There are various examples of image processing in step S508, S509 or S510 that enables visual distinction. Such examples include: processing for reducing saturation of the image, that is to say, processing for making a color image close to a black-and-white image; shading processing using uniform patterns such as dots and oblique lines; processing for reducing contrast of the image; processing for reducing brightness of the image; airbrushing processing; and mosaic processing.

The processing for enabling visual distinction is not limited to the above examples, and may be any image processing that enables visual distinction among the reading frequencies for image reading, the skip intervals for image reading, or the post-pixel update elapsed periods. Such image processing may be, for example, processing for changing the color or thickness of a frame corresponding to a reading region in an image, processing for displaying an icon, and processing for displaying a predetermined image (a numeric value and the like).

Furthermore, the processing for enabling visual distinction may be executed in a stepwise manner in accordance with whether or not the reading frequency for an image is high or low. Similarly, the processing for enabling visual distinction may be executed in a stepwise manner in accordance with whether or not the post-pixel update elapsed period is long or short. Similarly, the processing for enabling visual distinction may be executed in a stepwise manner in accordance with whether or not the skip interval is large or small.

For example, in the case where the image capturing unit can switch between a first reading frequency (for example, 10 fps) and a second reading frequency (for example, 30 fps), processing may be executed so as to enable visual distinction between a first image that is read in the first reading mode at 10 fps and a second image that is read in the second reading mode at 30 fps. In this case, the first image and the second image may be displayed in contrast to each other on the same screen, or may be displayed separately on different display apparatuses. Such display control can of course be applied also to the aforementioned all-pixel reading mode (first reading mode) and partial reading mode (second reading mode). That is to say, in the concept of the present invention, it is sufficient to realize processing for enabling visual distinction among images that are read in multiple types of reading modes of the image capturing unit, and the methods for outputting such images are not limited to the examples of display described above with reference to FIGS. 7A to 8B.

As described above, when displaying images read from an image capturing element that can change an image reading method, the present embodiment makes it possible to execute processing for enabling visual distinction among the reading frequencies for image reading, the skip intervals for image reading, or time periods that have elapsed since the last image update.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-007844, filed Jan. 18, 2013, which is hereby incorporated by reference herein in its entirety.

What is claimed is:

1. An image processing apparatus for processing captured image data read from an image capturing unit and to be displayed on a display unit, the apparatus comprising:
a non-transitory memory device;
a processor;
an input unit configured to input a first part of the captured image data read from the image capturing unit in accordance with a first reading mode and a second part of the captured image data read from the image capturing unit in accordance with a second reading mode; and
a processing unit configured to process the first part of the captured image data input by the input unit with a strength depending on the first reading mode such that the first reading mode used for reading the first part of the captured image data from the image capturing unit is visually distinguishable,
wherein the input unit and the processing unit are implemented at least in part by the processor executing at least one program recorded on the non-transitory memory device.

2. The apparatus according to claim 1, wherein
the reading mode includes a reading frequency, and the processing unit processes the first part of the captured image data input by the input unit such that the reading frequency at which the first part of the captured image data has been read from the image capturing unit is visually distinguishable.

3. The apparatus according to claim 1, wherein
the processing unit updates image data stored in a storage unit using the captured image data input by the input unit, and executes processing such that the reading mode used in reading the captured image data from the image capturing unit and a time period that has elapsed since the update of the image data stored in the storage unit using the captured image data input by the input unit are visually distinguishable.

4. The apparatus according to claim 1, wherein
the processing unit updates image data stored in a storage unit using the first and second parts of the captured image data that has been read from the image capturing unit in accordance with the first reading mode for a first region corresponding to the first part and the second reading mode for a second region corresponding to the second part, and processes the first part of the image data stored in the storage unit such that the first reading mode is visually distinguishable.

5. The apparatus according to claim 1, wherein
the input unit inputs captured image data that has been read from the image capturing unit through thinned-out reading in accordance with a reading mode, and the processing unit processes the captured image data input by the input unit such that the reading mode used in reading the captured image data from the image capturing unit through the thinned-out reading is visually distinguishable.

6. The apparatus according to claim 1, wherein
the reading mode includes at least one of a bit depth of the image capturing element and a number of bands of the image capturing element.

7. The apparatus according to claim 1, wherein
the processing unit applies at least one of processing for reducing saturation of an image, shading processing, processing for reducing contrast of an image, processing for reducing brightness of an image, airbrushing processing, and mosaic processing to the first part of the captured image data input by the input unit such that the first reading mode used in reading the first part of the captured image data from the image capturing unit is visually distinguishable.

8. An image processing method used in an image processing apparatus for processing captured image data read from an image capturing unit and to be displayed on a display unit, the method comprising:
inputting a first part of the captured image data read from the image capturing unit in accordance with a first reading mode and a second part of the captured image data read from the image capturing unit in accordance with a second reading mode; and
processing the first part of the input captured image data with a first strength depending on the first reading mode such that the first reading mode used for reading the first part of the captured image data from the image capturing unit is visually distinguishable.

9. The method according to claim 8, wherein
the reading mode includes a reading frequency, and in the processing, the first part of the input captured image data is processed such that the reading frequency at which the first part of the captured image data has been read from the image capturing unit is visually distinguishable.

10. The method according to claim 8, wherein
in the processing, image data stored in a storage unit is updated using the input captured image data, and processing is executed such that the reading mode used in reading the captured image data from the image capturing unit and a time period that has elapsed since the update of the image data stored in the storage unit using the input captured image data are visually distinguishable.

11. The method according to claim 8, wherein
in the processing, image data stored in a storage unit is updated using the first and second parts of the captured image data that has been read from the image capturing unit in accordance with the first reading mode for a first region corresponding to the first part and the second reading mode for a second region corresponding to the second part, and the first part of the image data stored in the storage unit is processed such that the first reading mode is visually distinguishable.

12. The method according to claim 8, wherein
in the inputting, captured image data that has been read from the image capturing unit through thinned-out reading in accordance with a reading mode is input, and in the processing, the input captured image data is processed such that the reading mode used in reading the captured image data from the image capturing unit through the thinned-out reading is visually distinguishable.

13. A non-transitory computer-readable storage medium having stored therein a computer program for executing a method of processing captured image data read from an image capturing unit and to be displayed on a display unit, the method comprising:
inputting a first part of the captured image data read from the image capturing unit in accordance with a first reading mode and a second part of the captured image data read from the image capturing unit in accordance with a second reading mode; and
processing the first part of the input captured image data with a first strength depending on the first reading mode such that the first reading mode used for reading the first part of the captured image data from the image capturing unit is visually distinguishable.

14. The non-transitory computer-readable storage medium according to claim 13, wherein
the reading mode includes a reading frequency, and in the processing, the first part of the input captured image data is processed such that the first reading frequency at which the first part of the captured image data has been read from the image capturing unit is visually distinguishable.

15. The non-transitory computer-readable storage medium according to claim 13, wherein
in the processing, image data stored in a storage unit is updated using the input captured image data, and processing is executed such that the reading mode used in reading the captured image data from the image capturing unit and a time period that has elapsed since the update of the image data stored in the storage unit using the input captured image data are visually distinguishable.

16. The non-transitory computer-readable storage medium according to claim 13, wherein
in the processing, image data stored in a storage unit is updated using the first and second parts of the captured image data that has been read from the image capturing unit in accordance with the first reading mode for a first region corresponding to the first part and the second reading mode for a second region corresponding to the second part, and the first part of the image data stored in the storage unit is processed such that the first reading mode is visually distinguishable.

17. The non-transitory computer-readable storage medium according to claim 13, wherein
in the inputting, captured image data that has been read from the image capturing unit through thinned-out reading in accordance with a reading mode is input, and in the processing step, the input captured image data is processed such that the reading mode used in reading the captured image data from the image capturing unit through the thinned-out reading is visually distinguishable.

18. The apparatus according to claim 1, wherein the processing unit is configured to control the reading mode for reading the captured image data of an area corresponding to a detection of an object.

19. The apparatus according to claim 1, wherein the second part of the captured image data is used for displaying an image in an area surrounded by an image displayed based on the first part of the captured image.

20. The apparatus according to claim 1, wherein the processing unit is configured to process the second part of the captured image data input by the input unit with a second strength depending on the second reading mode such that the first and second reading modes used for reading the first and second parts of the captured image data from the image capturing unit are visually distinguishable.

21. The apparatus according to claim 1, wherein the processing unit is configured to process the first part of the captured image data with the strength depending on an interval defined by the first reading mode.

22. The method according to claim 8, wherein the second part of the captured image data is used for displaying an image in an area surrounded by an image displayed based on the first part of the captured image.

23. The method according to claim 8, wherein in the processing, the second part of the captured image data input by the input unit is processed with a second strength depending on the second reading mode such that the first and second reading modes used for reading the first and second parts of the captured image data from the image capturing unit are visually distinguishable.

24. The method according to claim 8, wherein in the processing, the first part of the captured image data is processed with the strength depending on an interval defined in the first reading mode.

25. The non-transitory computer-readable storage medium according to claim 13, wherein the second part of the captured image data is used for displaying an image in an area surrounded by an image displayed based on the first part of the captured image.

26. The non-transitory computer-readable storage medium according to claim 13, wherein in the processing, the second part of the captured image data input by the input unit is processed with a second strength depending on the second reading mode such that the first and second reading modes used for reading the first and second parts of the captured image data from the image capturing unit are visually distinguishable.

27. The non-transitory computer-readable storage medium according to claim 13, wherein in the processing, the first part of the captured image data is processed with the strength depending on an interval defined in the first reading mode.

* * * * *